Figures 1, 2:
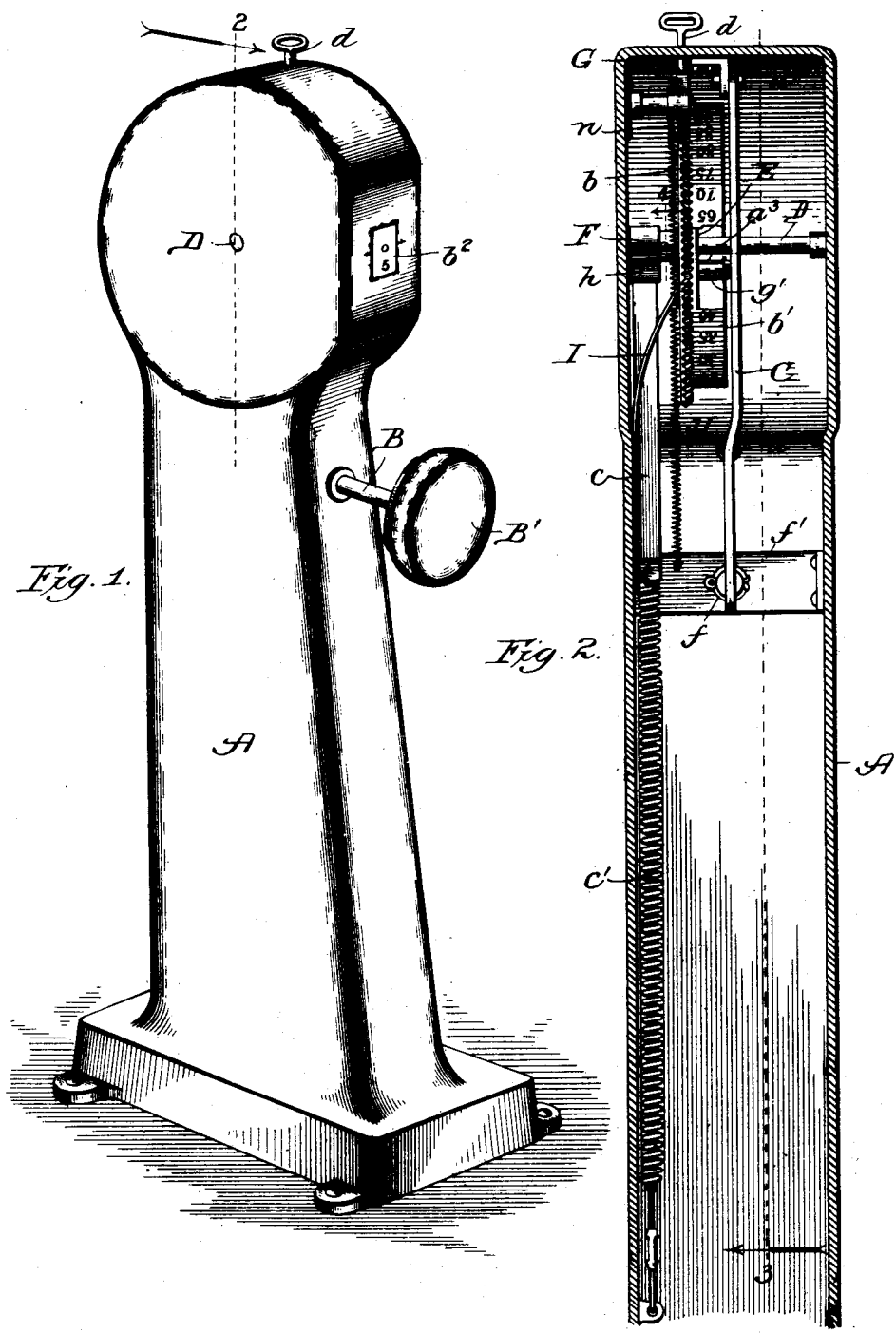

No. 710,705. Patented Oct. 7, 1902.
H. S. MILLS.
BLOW TESTING MACHINE.
(Application filed Mar. 18, 1902.)
(No Model.) 3 Sheets—Sheet 1.

Witnesses:
Inventor:
Herbert S. Mills,

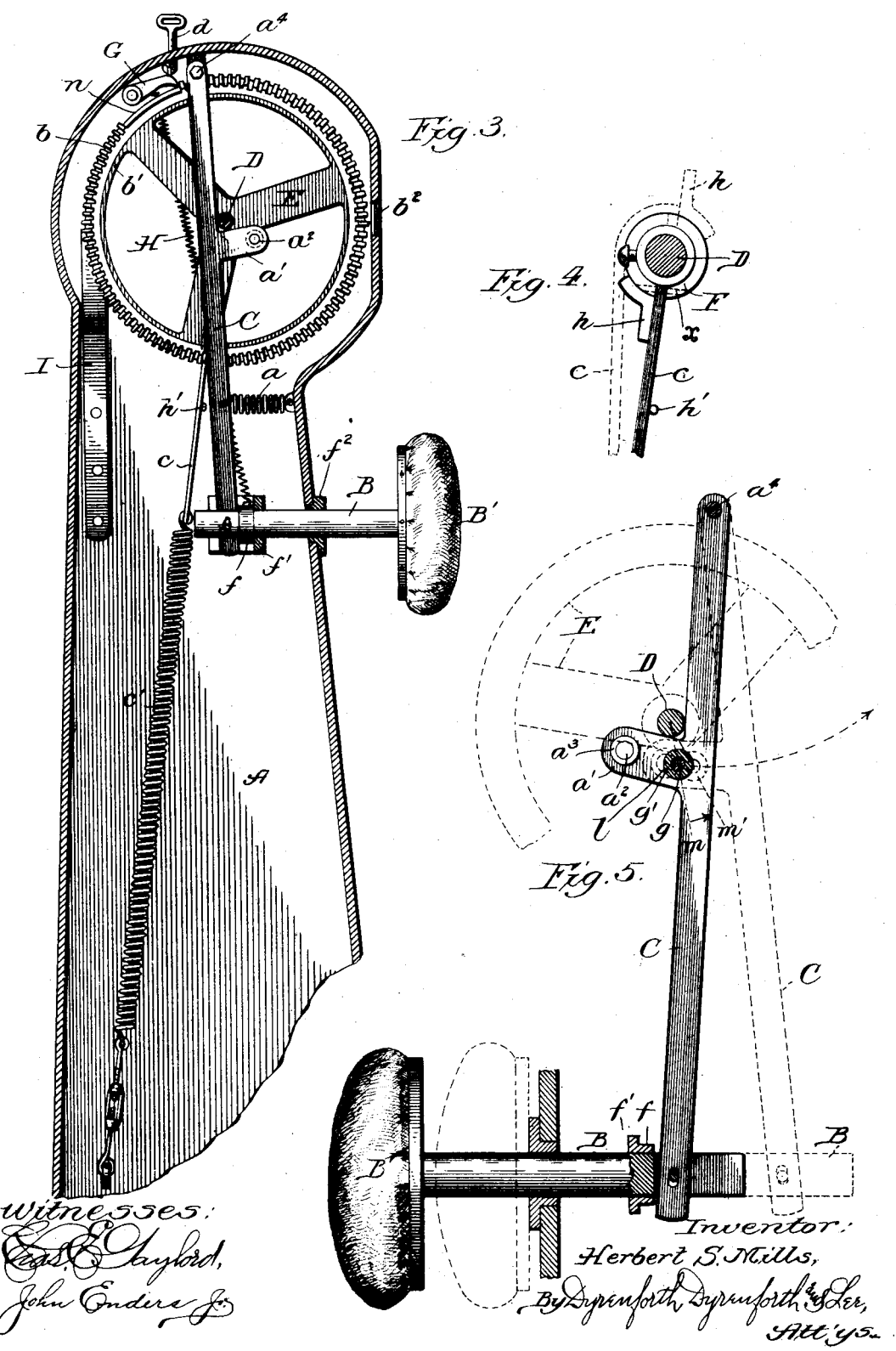

No. 710,705. Patented Oct. 7, 1902.
H. S. MILLS.
BLOW TESTING MACHINE.
(Application filed Mar. 18, 1902.)
(No Model.) 3 Sheets—Sheet 3.
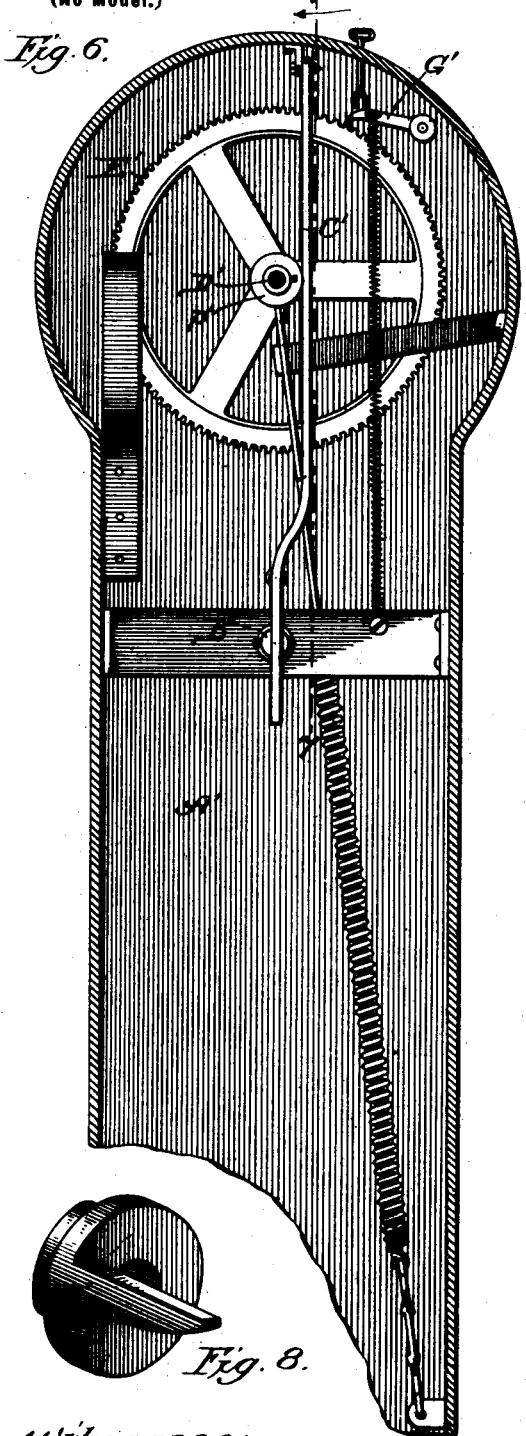
Fig. 6.
Fig. 8.
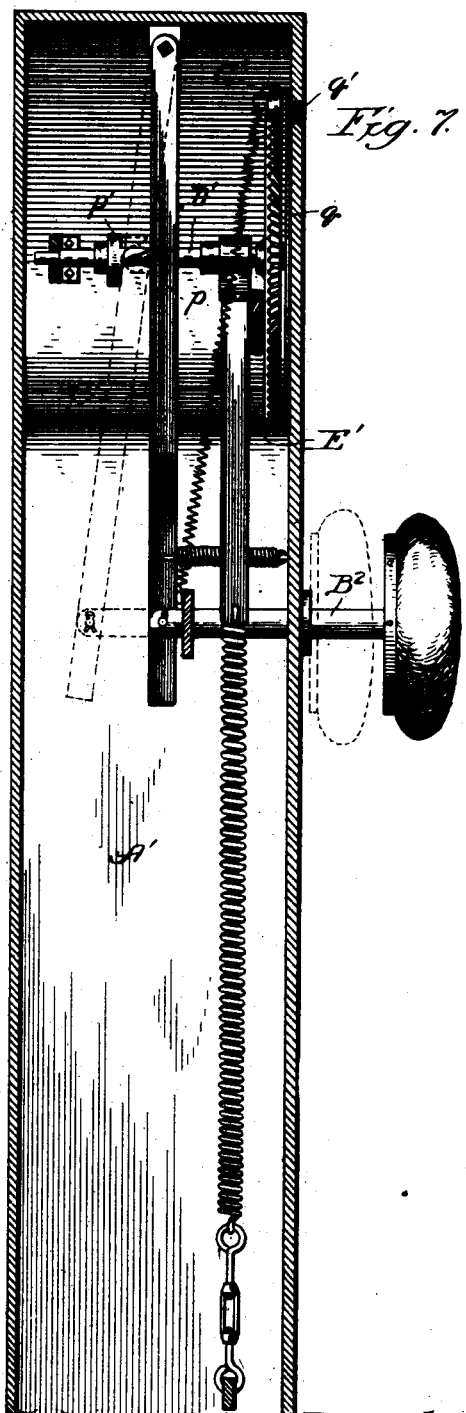
Fig. 7.
Witnesses:
Inventor:
Herbert S. Mills,

UNITED STATES PATENT OFFICE.

HERBERT S. MILLS, OF CHICAGO, ILLINOIS.

BLOW-TESTING MACHINE.

SPECIFICATION forming part of Letters Patent No. 710,705, dated October 7, 1902.

Application filed March 18, 1902. Serial No. 98,824. (No model.)

*To all whom it may concern:*

Be it known that I, HERBERT S. MILLS, a citizen of the United States, residing at Chicago, in the county of Cook and State of Illinois, have invented a new and useful Improvement in Blow-Testing Machines, of which the following is a specification.

My invention relates particularly to machines for testing the strength of blows of the fist; and my primary object is to provide mechanism accurately responsive to a true blow or sharp impact, but unresponsive to a continuing or shoving force.

My invention is illustrated in the accompanying drawings, in which—

Figure 1 represents a front perspective view of my invention in its preferred embodiment; Fig. 2, a section parallel to the front of the machine, taken as indicated at line 2 of Fig. 1; Fig. 3, a section parallel to a side of the machine, as indicated at line 3 of Fig. 2; Fig. 4, an enlarged broken section taken as indicated at line 4 of Fig. 2; Fig. 5, a broken sectional view illustrating how a blow is imparted to an inertia-carried wheel employed for operating the indicator; Fig. 6, a section parallel to the front of a casing of modified form and showing mechanism of a modified form; Fig. 7, a section taken as indicated at line 7 of Fig. 6, and Fig. 8 a perspective view of a cam employed on the indicator-shaft in the modified construction.

Referring to Figs. 1 to 5, inclusive, A represents a casing of any suitable form; B, a plunger provided with a cushion-head B'; C, a plunger-actuated lever normally held in its advanced position by a spring $a$ and bearing a lug $a'$, equipped with a stud $a^2$, upon which is journaled a roller $a^3$, said lever being pivoted at $a^4$; D, a shaft perpendicular to the plunger B and journaled in suitable bearings, with which the casing is provided; E, a wheel fixed to the shaft D, the same being provided peripherally with teeth $b$ and adjacent thereto with a flange $b'$, bearing characters indicating the strength of blow, said characters being exhibited through an opening $b^2$, with which the casing-front is provided; F, a sleeve fixed to the shaft D and serving as a connection through the medium of a pin $x$ for a strap $c$, the lower end of which is connected by a spring $c'$ with the lower portion of the casing; G, a pawl engaging the periphery of the wheel E, said pawl being provided with a releasing-handle $d$, projecting through the top of the casing; H, a spring serving to hold said pawl in engagement with said wheel, and I a friction-brake for the wheel E and comprising a leaf-spring secured at one end to the casing and bearing at the opposite end on a lateral surface of the wheel.

The plunger B is limited in its outward movement by a collar $f$, which engages a stop $f'$, and is limited in its inward movement by a rubber or leather cushion $f^2$. The wheel E is provided with a stud $g$, equipped with a roller $g'$, said roller being located near the center of said wheel and in the path of the roller $a^3$. The sleeve F is provided with a short arm $h$, which in the position of the parts indicated by the full lines in Fig. 4 engages the strap $c$ to stop the rearward rotation of the wheel E under the action of the spring $c'$. The strap itself in this position bears against a stud $h'$, projecting inwardly from a wall of the casing. Said sleeve is secured on its shaft by a set-screw, as shown, and clamps the strap to the shaft. In Fig. 2 a portion of the flange $b'$ of the indicator-wheel is broken away to show the location of the roller $a^3$ with reference to the roller $g'$.

The operation will be readily understood from the foregoing detailed description. When the plunger B is struck, the lever C is swung inwardly through the arc $a^2\ a^4\ l$ (shown in Fig. 5) and encounters the roller $g'$, imparting a sharp blow to the wheel E. The roller $a^3$ remains in contact with the roller $g'$, while the wheel E moves through the arc $m\ m'$, after which the inertia of the wheel causes it to continue its rotation, drawing the strap $c$ to the position, for instance, indicated in dotted lines in Fig. 4. The pawl G serves to prevent the wheel from returning to its original position, assuming the wheel to have moved far enough to bring the first tooth, Fig. 3, to the left of the space $n$ into engagement with said pawl. The number registered is observed through the transparently-covered opening $b^2$. When desired, the pawl may be released by means of the handle $d$, thereby allowing the wheel E to be returned under the action of the spring $c'$ to the original position. From Fig. 5 it will be evident that the wheel E can be moved only through an insignificant space by pushing or shoving the plunger B, whereas if a hard sharp blow be imparted to the plunger said blow will be transmitted to the wheel, which will thereby acquire such inertia as to correctly indicate the strength of the blow struck.

In the construction illustrated in Figs. 6 to 8, inclusive, the casing A' is of modified form and the indicator-shaft D' is parallel to the plunger B². The lever C' swings in a plane parallel with the shaft D' and bears a roller $p$, which engages a cam $p'$, fixed to the shaft. The shaft D' is equipped with a wheel E', provided peripherally with teeth engaged by a pawl G', and the shaft D' bears an indicator wheel or disk $q$, which is parallel to the wheel E' and has its numerals exposed at the sight-opening $q'$. The construction otherwise corresponds to the construction already described, and it will be understood from Fig. 7 that the inward movement of the plunger B² is limited, thereby imparting only slight movement to the shaft D' and the wheel E' in the event that the plunger is merely shoved or pushed, but imparting such inertia to the wheel E' as will cause the indicator to revolve and correctly indicate the blow in the event that the plunger is sharply struck.

It is evident that the gist of my invention lies in the employment of a plunger bearing or moving a striking part which has a limited striking contact with an inertia-actuated indicator.

Changes in details of construction within the spirit of my invention may be made. Hence no undue limitation is to be understood from the foregoing detailed description.

What I claim as new, and desire to secure by Letters Patent, is—

1. In a blow-testing machine, the combination of a plunger having a suitable head for receiving a blow from the fist, a striking member moved by said plunger, and a pivoted inertia-carried indicator with blow-receiving means with which said striking member has limited striking contact, substantially as described.

2. In a blow-testing machine, the combination of a suitable frame, a plunger, a striking member moved by said plunger, a rotary indicator, and inertia-carried rotary actuating means for said indicator provided with blow-receiving means with which said striking member has limited striking contact.

3. In a blow-testing machine, the combination of a suitable frame, a plunger, a striking member moved by said plunger, an inertia-carried rotary wheel, blow-receiving means with which said striking member has limited striking contact and through the medium of which said wheel is initially actuated, and indicating means.

4. In a blow-testing machine, the combination of a suitable frame, a hand-struck member, a striking member moved by said last-named member, a spring-held inertia-carried rotary member provided with blow-receiving means with which said striking member has limited striking contact, and indicating means.

5. In a blow-testing machine, the combination of a suitable frame, a plunger, a plunger-actuated lever provided with striking means, and a yieldingly-held inertia-carried rotary indicator provided with blow-receiving means with which said striking means has limited striking contact, for the purpose set forth.

6. In a blow-testing machine, the combination of a suitable frame, a plunger, a rotary inertia-carried member with a shaft substantially perpendicular to said plunger, striking means actuated by said plunger, and blow-receiving means through the medium of which said rotary member is initially actuated and with which said striking means has limited striking contact.

7. In a blow-testing machine, the combination of a suitable frame, a plunger, a rotary inertia-carried member with axis perpendicular to said plunger, and provided with blow-receiving means, a plunger-actuated lever swinging in a plane substantially perpendicular to said axis, and striking means carried by said lever and having limited striking contact with said blow-receiving means.

8. In a blow-testing machine, the combination of a suitable casing, a plunger, a striking member moved by said plunger, an inertia-carried yieldingly-held rotary member, blow-receiving means through the medium of which said rotary member is initially actuated and with which said striking member has limited striking contact, and retractable means for preventing the return of said rotary member.

9. In a blow-testing machine, the combination of a suitable casing, a plunger, a shaft perpendicular to said plunger, a rotary member carried by said shaft and provided with blow-receiving means, and a plunger-actuated lever swinging in a plane perpendicular to said shaft and provided with blow-imparting means, for the purpose set forth.

10. In a blow-testing machine, the combination of a suitable casing, a plunger, a lever pivoted at one end in said casing and connected at the other end with said plunger, a blow-imparting stud carried by said lever intermediate its ends, a yieldingly-held rotary member provided with a blow-receiving stud, and means for controlling the return movement of said rotary member, for the purpose set forth.

HERBERT S. MILLS.

In presence of—
 ALBERT D. BACCI,
 W. B. DAVIES.